(12) United States Patent
Gravel (10) Patent No.: US 10,362,905 B1
(45) Date of Patent: Jul. 30, 2019

(54) WHISK AND DIGITAL THERMOMETER (71) Applicant: Raymond Gravel, Charlotte, NC (US)

(72) Inventor: Raymond Gravel, Charlotte, NC (US)

( * ) Notice: Subject to any disclaimer, the term of this patent is extended or adjusted under 35 U.S.C. 154(b) by 134 days.

(21) Appl. No.: 15/689,068

(22) Filed: Aug. 29, 2017

(51) Int. Cl.
*A47J 43/10* (2006.01)
*G01K 1/14* (2006.01)
*G01K 1/02* (2006.01)
*H04B 5/02* (2006.01)
*H04B 5/00* (2006.01)

(52) U.S. Cl.
CPC .......... *A47J 43/1093* (2013.01); *G01K 1/022* (2013.01); *G01K 1/028* (2013.01); *G01K 1/14* (2013.01); *H04B 5/0006* (2013.01); *H04B 5/02* (2013.01); *G01K 2207/06* (2013.01); *G01K 2217/00* (2013.01)

(58) Field of Classification Search
CPC . A47J 43/28; A47J 43/10; G01K 7/00; G01K 13/00; G01K 2207/08; G01K 2217/00
USPC ............. 374/100, 170, 163, 120; 340/870.17
See application file for complete search history.

(56) References Cited

U.S. PATENT DOCUMENTS

| | | | | |
|---|---|---|---|---|
| 2,573,837 | A * | 11/1951 | Fox | A47J 36/165 366/311 |
| 3,277,714 | A | 10/1966 | Crandell | |
| D217,879 | S | 6/1970 | Biolik | |
| 5,575,563 | A | 11/1996 | Chiu | |
| 5,688,045 | A | 11/1997 | Butte | |
| 6,220,746 | B1 | 4/2001 | Stern | |
| 6,264,358 | B1 | 7/2001 | Eisaman | |
| 2003/0147450 | A1* | 8/2003 | Witonsky | G01K 1/14 374/141 |
| 2015/0103618 | A1* | 4/2015 | Murphy | A47J 43/10 366/129 |
| 2015/0257603 | A1* | 9/2015 | Lee | A47J 43/1093 366/129 |
| 2017/0150841 | A1* | 6/2017 | Johncock | A47J 27/62 |
| 2018/0038737 | A1* | 2/2018 | Hedlund | A47J 45/068 |

FOREIGN PATENT DOCUMENTS

| | | | | |
|---|---|---|---|---|
| CA | 2530089 | A1 * | 6/2006 | .......... A47J 43/1093 |
| CN | 201025456 | Y * | 2/2008 | |
| CN | 201564169 | U * | 9/2010 | |
| CN | 203534720 | U * | 4/2014 | |
| CN | 05910948 | A * | 8/2016 | |
| CN | 206862903 | U * | 1/2018 | |
| DE | 3636173 | A1 * | 5/1988 | .............. A47J 43/10 |
| FR | 2247184 | A * | 6/1975 | |
| GB | 574344 | A * | 1/1946 | |
| TW | 279214 | B1 * | 1/2019 | |

* cited by examiner

*Primary Examiner* — Gail Kaplan Verbitsky (57) ABSTRACT

The whisk and digital thermometer comprises a kitchen whisk capable of monitoring the temperature of the food that the whisk is in contact with. A temperature sensing probe extends downward from the handle of the whisk into the food and a temperature sensor within the probe may be read by electronics in the handle of the whisk. A display on the handle may report the temperature of the food. Embodiments may comprise a voice synthesis unit and sound transducer to allow the whisk to audibly report the monitored temperature. Embodiments may comprise a wireless transceiver that allows the whisk to report the monitored temperature to an earpiece worn by a cook at a remote location, such as at another kitchen work area.

13 Claims, 5 Drawing Sheets

WHISK AND DIGITAL THERMOMETER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of kitchen utensil, more specifically, a combination whisk and digital thermometer.

SUMMARY OF INVENTION

The whisk and digital thermometer comprises a kitchen whisk capable of monitoring the temperature of the food that the whisk is in contact with. A temperature sensing probe extends downward from the handle of the whisk into the food and a temperature sensor within the probe may be read by electronics in the handle of the whisk. A display on the handle may report the temperature of the food. Embodiments may comprise a voice synthesis unit and sound transducer to allow the whisk to audibly report the monitored temperature. Embodiments may comprise a wireless transceiver that allows the whisk to report the monitored temperature to an earpiece worn by a cook at a remote location, such as at another kitchen work area. A heat-conducting spacer called a spider may provide structural support for the whisk and may conduct heat towards the temperature probe.

An object of the invention is to provide a provide a kitchen whisk for stir food.

Another object of the invention is to provide a temperature probe for monitoring the temperature of the food that the whisk is in contact with and to visually display the monitored temperature.

A further object of the invention is to provide a heat-conducting spaced between the temperature probe and the loops of the whisk.

Yet another object of the invention is to report the monitored temperature audibly in the form of a spoken voice at the whisk and/or wirelessly to an earpiece worn by a cook.

These together with additional objects, features and advantages of the whisk and digital thermometer will be readily apparent to those of ordinary skill in the art upon reading the following detailed description of the presently preferred, but nonetheless illustrative, embodiments when taken in conjunction with the accompanying drawings.

In this respect, before explaining the current embodiments of the whisk and digital thermometer in detail, it is to be understood that the whisk and digital thermometer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the whisk and digital thermometer.

It is therefore important that the claims be regarded as including such equivalent construction insofar as they do not depart from the spirit and scope of the whisk and digital thermometer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The whisk and digital thermometer 100 (hereinafter invention) comprises a handle 200, a plurality of wire loops 300 and a temperature probe 400. The invention 100 is able to stir food 900 that is cooking in a pot 910 and simultaneously monitor and report a temperature of the food 900.

The handle 200 provides a grasping surface that allows a cook (not illustrated in the figures) to carry and manipulate the invention 100. The handle 200 also provides a housing for a circuit board 410 of electronics that measure and report the temperature. The handle 200 may comprise a handle body 250 and a cap 260.

The handle body 250 may be a hollow cylinder composed of a durable material. As non-limiting examples, the handle body 250 may be fabricated from plastic, wood, or a metal. In some embodiments, the handle body 250 may be fabricated from stainless steel. A top 290 of the handle body 250 may be open to accept the cap 260. The top 290 of the handle body 250 may provide a threaded interior interface for coupling with the cap 260. A bottom 295 of the handle body 250 may be closed except for a central hole for passage of the temperature probe 400 and except for a plurality of holes that accept ends of the plurality of wire loops 300.

The cap 260 may be an enclosed cylinder that houses the electronics and one or more batteries 420. The top 290 surface of the cap 260 may comprise an operator control panel 450. The bottom 295 surface of the cap 260 may comprises a threaded interface that couples to the handle body 250. The temperature probe 400 is coupled to the bottom 295 of the cap 260 and extends downwards from the center of the cap 260.

The plurality of wire loops 300 comprise the whisk portion of the invention 100. An individual loop 305 selected from the plurality of wire loops 300 may be a straight piece of wire that has been bent into a horseshoe shape. The loose ends of the individual loop 305 are then inserted into the bottom 295 of the handle body 250. Each of the plurality of wire loops 300 extend into the handle body 250 by a different distance so that the bent portion of the individual loops 305 may pass each other without interference at the bottom 295 of the invention 100.

The temperature probe 400 may comprise a metal shaft located at the longitudinal center of the invention 100. The temperature probe 400 may couple to the circuit board 410 located within the cap 260 and may run through the center of the handle 200, emerging from the bottom 295 of the handle 200 and running towards the bottom 295 of the invention 100. The temperature probe 400 may stop short of reaching the plurality of wire loops 300 at the bottom 295 of the invention 100. The temperature probe 400 may comprise a temperature sensor 405 which is located at the bottom 295 of the temperature probe 400 and which is coupled to the circuit board 410 via wiring.

Figure 1:
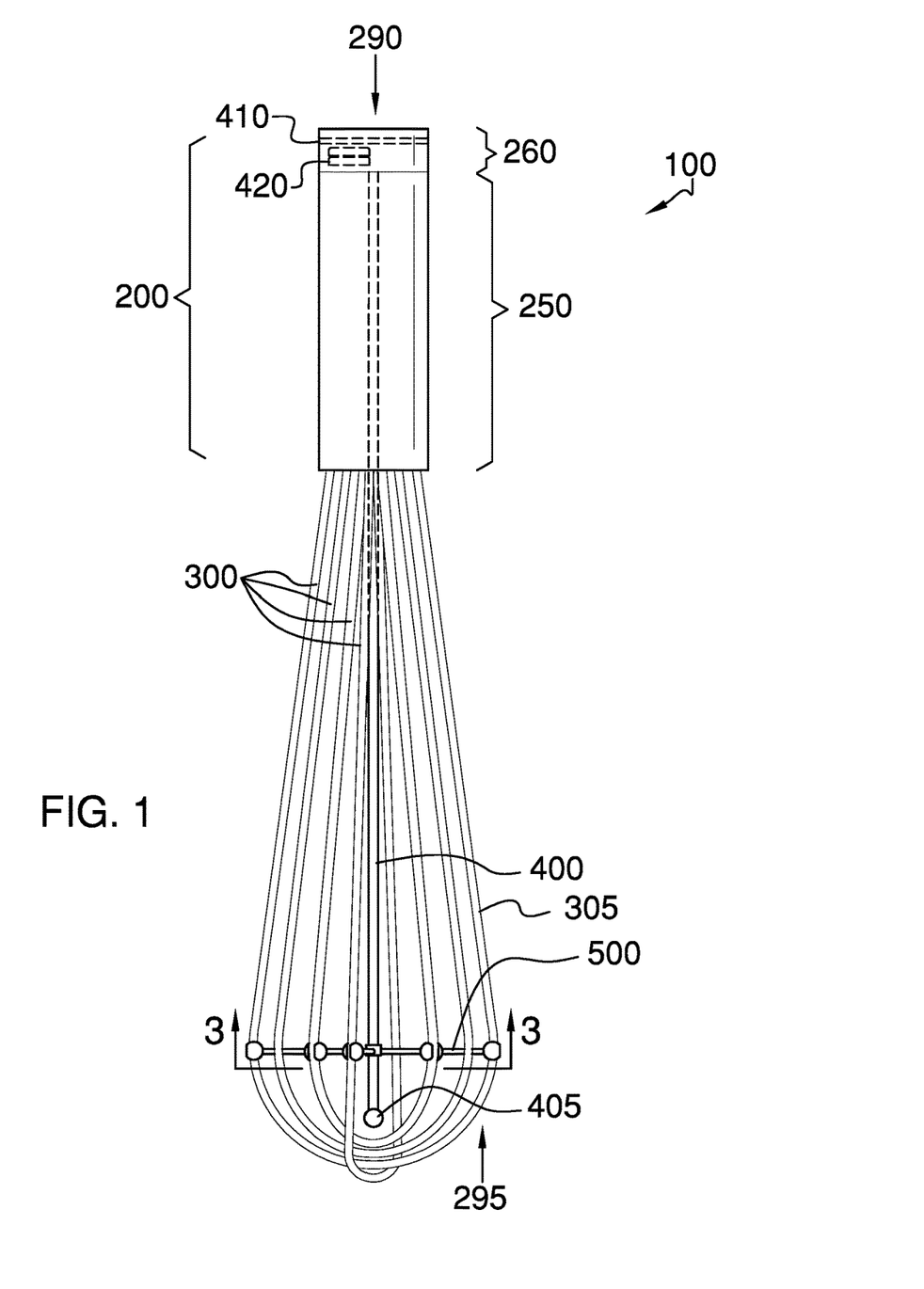
FIG. 1 is a front view of an embodiment of the disclosure.
Figure 2:
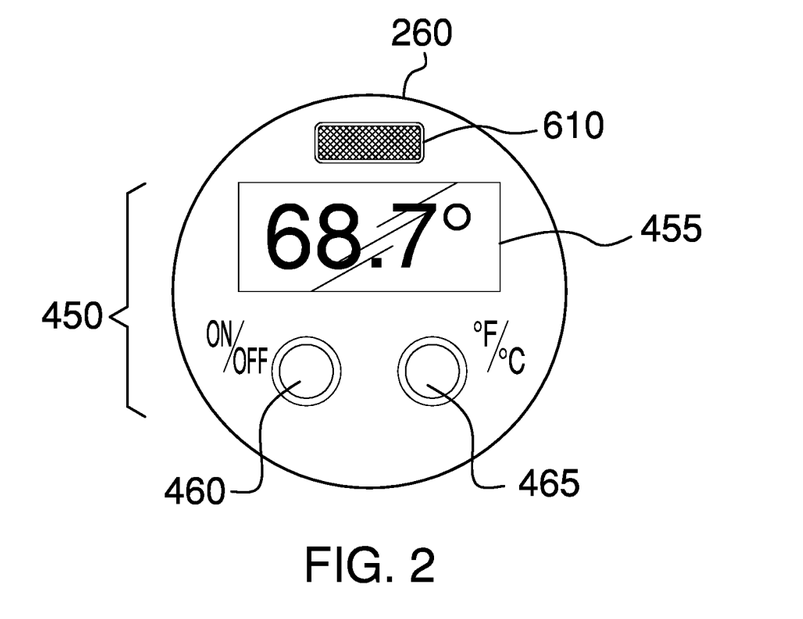
FIG. 2 is a top view of an embodiment of the disclosure.
Figure 3:
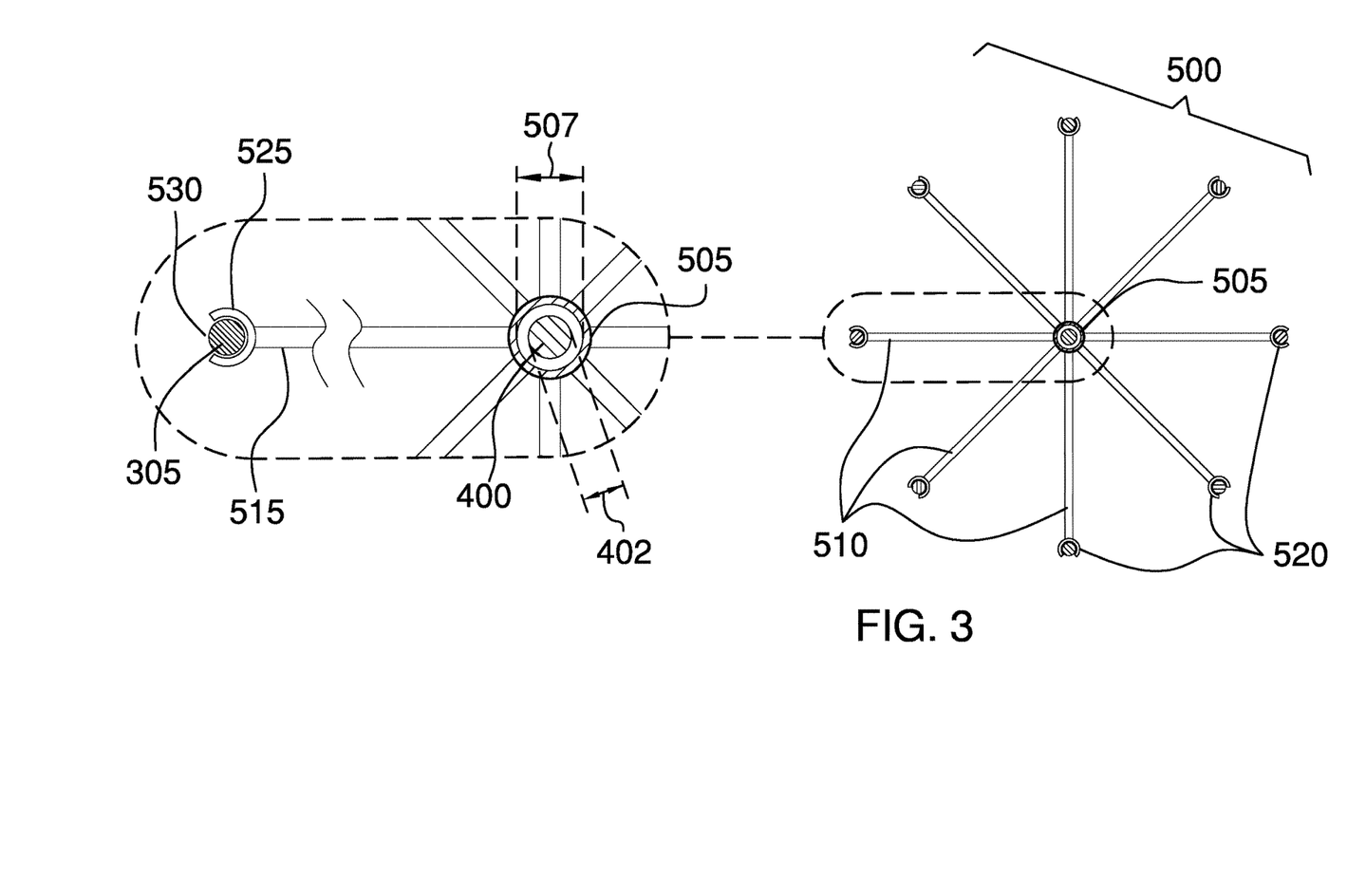
FIG. 3 is a cross-sectional view of an embodiment of the disclosure across 3-3 as shown in FIG. 1 with details of the spider.

In some embodiments, the invention 100 may further comprise a spider 500. The spider 500 may provide mechanical support for the plurality of wire loops 300 and for the temperature probe 400. The spider 500 comprises a central ring 505, a plurality of radial arms 510, and a plurality of loop clips 520. The central ring 505 has an inner diameter 507 that is at least as large as an outer diameter 402 of the temperature probe 400. There are two individual radial arms 515 for each one of the individual loops 305 comprising the whisk. The plurality of radial arms 510 extend outward from the central ring 505 and are equally spaced around the circumference of the central ring 505. The plurality of loop clips 520 is coupled to the ends of the plurality of radial arms 510. There are two individual loop clips 525 for each one of the individual loops 305 comprising the whisk. The individual loop clip 525 selected from the plurality of loop clips 520 comprises a ring with a loop clip gap 530. The loop clip gap 530 extends from 25% of the circumferences of the plurality of loop clips 520 to 50% of the circumference of the plurality of loop clips 520. The individual radial arm 515 couples to the individual loop clip 525 at a point on the circumference of the plurality of loop clips 520. The plurality of loop clips 520 clip onto the plurality of wire loops 300 and thereby mechanically couple the plurality of wire loops 300 to the spider 500.

The spider 500 may be installed by passing it through the spaces between the plurality of wire loops 300 and turning it to align the central ring 505 with the temperature probe 400. The temperature probe 400 is passed through the central ring 505 and the plurality of loop clips 520 are coupled to the plurality of wire loops 300 by pressing each of the individual loops 305 into one of the individual loop clips 525. Because the individual loops 305 are bent wires, each of the individual loops 305 couples to two of the individual loop clips 525, generally on opposites sides of the central ring 505.

Figure 4:
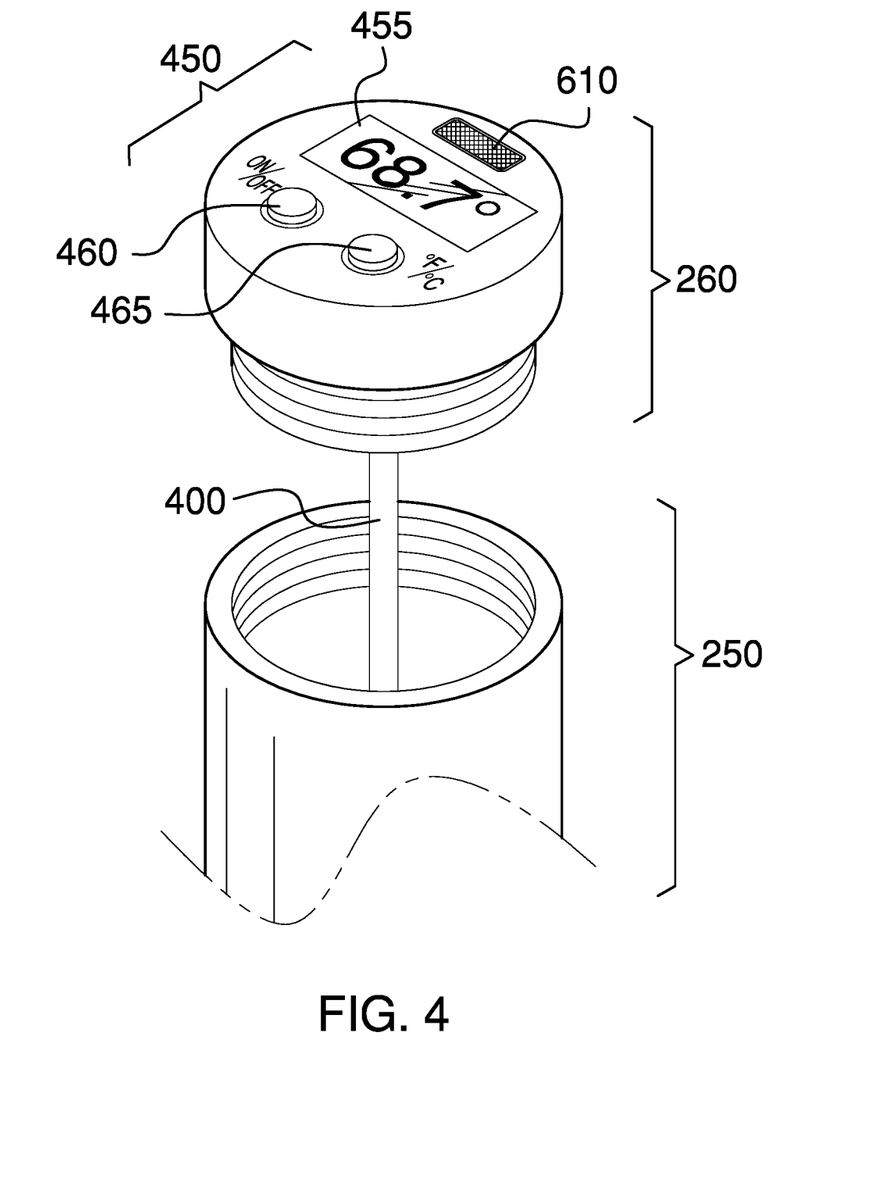
FIG. 4 is a detail view of an embodiment of the disclosure showing the cap and the top of the handle body.

The operator control panel 450 comprises a temperature display 455, an on/off control 460 and a unit selection control 465. The temperature display 455 may be a display which is coupled to the electronics and which is used to display the temperature currently sensed by the temperature sensor 405 located in the temperature probe 400. The temperature display 455 displays at least 2 digits and may include a decimal point and/or a degree symbol ('°'). The operator control panel 450 may include the letter 'C' and/or the letter 'F' to indicate that the digits are displaying a temperature according to either the Fahrenheit temperature scale or according to the Celsius temperature scale. As non-limiting examples, the temperature display 455 may be an LCD display or an LED display.

The on/off control 460 may be a control that allows the invention 100 to be turned on and off. As a non-limiting example, the on/off control 460 may be a button where each activation of the button toggles the invention 100 between an 'on' state and an 'off' state where the invention 100 is operative to measure and report the temperature when in the 'on' state and where the invention 100 is not operative in the 'off' state.

The unit selection control 465 may be a control that selects between Fahrenheit and Celsius units displayed on the temperature display 455. As a non-limiting example, the unit selection control 465 may be a button where each activation of the button toggles the temperature display 455 between a 'Fahrenheit display' state and a 'Celsius display' state.

The one or more batteries 420 may provide electrical energy to power the circuit board 410, the operator control panel 450, and the temperature sensor 405. In embodiments that comprise a voice synthesis unit (not illustrated in the figures) or a wireless transceiver (not illustrated in the figures), the one or more batteries 420 may also power the voice synthesis unit or the wireless transceiver. The one or more batteries 420 may be located within the handle 200, including the cap 260, and may be accessible by removing the cap 260. When the one or more batteries 420 are discharged, they may be replaceable or rechargeable. As non-limiting examples, the one or more batteries 420 may be AA, AAA, or coin form factor batteries.

In some embodiments, the invention 100 may comprise the voice synthesis unit and a sound transducer 610. The voice synthesis unit may be one or more electronic components capable of producing a signal that conveys a recognizable voice. Specifically, the voice synthesis unit may accept a signal representing the temperature being displayed on the temperature display 455 and produce an audio signal representing the audio of the temperature value being spoken. The audio signal may be sent via wiring to the sound transducer 610 located within the handle 200 to be converted into an audible sound 615. Under control of the electronics in the cap 260, the temperature may be monitored repeatedly. The temperature may be converted to the audio signal and may be played through the sound transducer 610 each time the temperature changes, on a periodic basis, whenever the temperature deviates from a predefined range, or a combination thereof.

Figure 5:
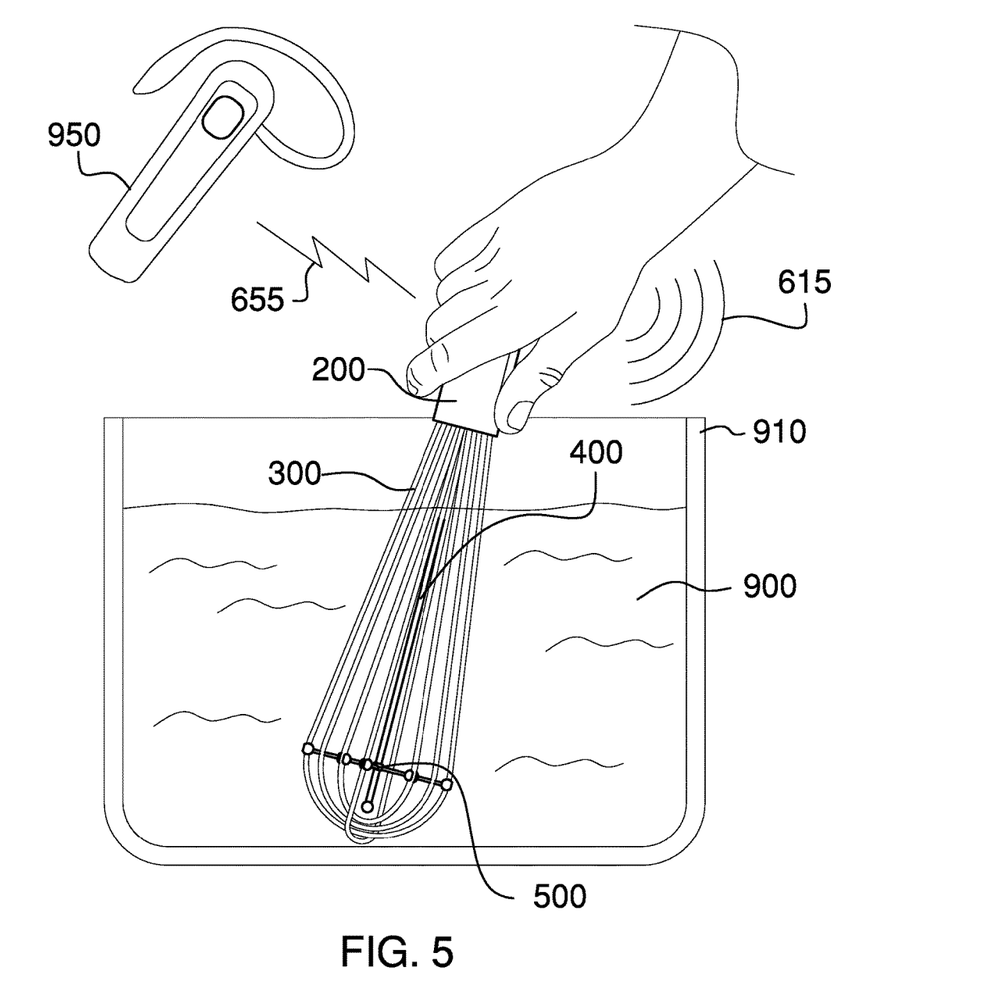
FIG. 5 is a side view of an embodiment of the disclosure showing usage.

In some embodiments, the invention 100 may comprise the wireless transceiver. The wireless transceiver may accept the audio signal and may wirelessly transmit an RF signal 655 carrying the audio signal to a wireless earpiece 950 worn by the cook. This may allow the cook to temporarily leave the pot 910 to perform some other task while continuing to be made aware of the temperature of the food 900 in the temperature. In some embodiments, the wireless earpiece 950 may be a Bluetooth® earpiece and the RF signal 655 between the invention 100 and the wireless earpiece 950 may conform to one or more Bluetooth® protocols or standards.

In use, the cook turns the invention 100 on by activating the on/off control 460. The cook may place the food 900 into the pot 910 and heat it. The invention 100 may be used to stir the food 900 while it heats. The cook may observe the temperature of the food 900 by looking at the temperature display 455 and may select either degrees F. or degrees C. on the temperature display 455 by activating the unit selection control 465. If so equipped, the invention 100 may audibly announce the temperature of the food 900 periodically using the voice synthesis unit and the sound transducer 610. If so equipped, the invention 100 may wirelessly communicate with the wireless earpiece 950 worn by the cook to audibly announce the temperature of the food 900 into the ear of the cook, even if the cook is in a remote part of the kitchen. When no longer needed, the invention 100 may be removed from the pot 910, the spider 500 may be removed from the temperature probe 400 and the plurality of wire loops 300, and all parts may be cleaned, reassembled, and stored.

Definitions

As used herein, "align" means to place two or more components into positions and orientations that allow the next step of assembly to proceed. As a non-limiting example, the next step of assembly may be to insert one component into another component.

Throughout this document the terms "battery", "battery pack", and "batteries" may be used interchangeably to refer to one or more wet or dry cells or batteries of cells that provide DC power to the invention. References to recharging or replacing batteries may be construed to mean recharging or replacing individual cells, individual batteries of cells, or a package of multiple battery cells as is appropriate for any given battery technology that may be used.

As used in this disclosure, "Bluetooth" is a standardized communication protocol that is used to wirelessly interconnect electronic devices. Bluetooth® is a registered trademark of Bluetooth SIG.

As used in this disclosure, a "clip" is a fastener that attaches to an object by gripping or clasping the object. A clip is typically spring loaded.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, a "cylinder" is a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically means a right cylinder, which is defined as a cylinder wherein the curved surface perpendicularly intersects with the two identical flat and parallel ends.

As used in this disclosure, a "diameter" of an object is a straight line segment (or a radial line) that passes through the center (or center axis) of an object. The line segment of the diameter is terminated at the perimeter or boundary of the object through which the line segment of the diameter runs.

As used in this disclosure, a "display" is a surface upon which is presented an image, potentially including, but not limited to, graphic images and text, that is interpretable by an individual viewing the projected image in a meaningful manner.

As used herein, the word "durable" refers to a material's ability to withstand wear, pressure, impact, heat, cold, sun exposure, and other forms of potentially damaging conditions without suffering any significant deterioration of quality or value.

As used herein, "food" refers to any substance that people or animals eat or drink, or that plants absorb.

As used in this disclosure, the term "form factor" refers to the size and shape of an object.

As used in this disclosure, a "handle" is an object by which a tool, object, or door is held or manipulated with the hand.

As used in this disclosure, a "housing" is a rigid casing that encloses and protects one or more devices.

As used in this disclosure, the term "inner diameter" refers to a diameter measured from one inner surface of the object to the same inner surface on the opposing side of the object.

As used in this disclosure, an "interface" is a physical or virtual boundary that separates two different systems and across which information is exchanged.

As used in this disclosure, the "interior" is use as a relational term that implies that an object is contained within the boundary of a structure or a space.

As used in this disclosure, "LCD" is an acronym for Liquid Crystal Display. A liquid crystal display comprises a liquid crystal film placed between two sheets of transparent material. The visual characteristics of the LCD can be varied through the application of a voltage.

As used in this disclosure, an "LED" is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

As used in this disclosure, the term "outer diameter" refers to a diameter measured from one outer surface of the object to the same outer surface on the opposing side of the object.

As used in this disclosure, the term "radial" refers to a direction that: 1) is perpendicular to an identified central axis; or, 2) projects away from a center point.

As used herein, a "ring" is a circular armature.

As used in this disclosure, a "scale" refers to a system of ordered markings that are used as a reference for a measurement; the values associated with the ordered markings may be presented visually as indicia along a reference standard or as individual values on a digital readout.

As used in this disclosure, a "sensor" is a device that receives and responds in a predetermined way to a signal or stimulus.

As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used in this disclosure, a "transceiver" is a device that is used to transmit and receive signals. The signals may be audible, optical, or RF in nature.

As used in this disclosure, a "transducer" is a device that converts a physical quantity, such as pressure or brightness into an electrical signal or a device that converts an electrical signal into a physical quantity.

As used herein, a "whisk" is a kitchen utensil comprising a plurality of wire loops mounted onto a handle and used to beat or whip food.

As used in this disclosure, a "wire" is a structure with the general appearance of a cord or strand but that: 1) may not have the tensile or compressive characteristics of a cord; and, 2) is made from an electrically conductive material.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A whisk and digital thermometer comprising:
a handle, a plurality of wire loops and a temperature probe;
wherein the whisk and digital thermometer is able to stir food that is cooking in a pot and simultaneously monitor and report a temperature of the food;
wherein the handle is adapted to provide a grasping surface that allows a cook to carry and manipulate the whisk and digital thermometer;
wherein the handle provides a housing for a circuit board of electronics that measure and report the temperature;
wherein the handle comprises a handle body and a cap;
wherein a top of the handle body is open to accept the cap;
wherein the top of the handle body provides a threaded interior interface for coupling with the cap;
wherein a bottom of the handle body is closed except for a central hole for passage of the temperature probe and except for a plurality of holes that accept ends of the plurality of wire loops;
wherein the cap is an enclosed cylinder that houses the electronics and one or more batteries;
wherein the top surface of the cap comprises an operator control panel;
wherein the bottom surface of the cap comprises a threaded interface that couples to the handle body;
wherein the temperature probe is coupled to the bottom of the cap and extends downwards from the center of the cap;
wherein the plurality of wire loops comprise the whisk portion of the whisk and digital thermometer;
wherein an individual loop selected from the plurality of wire loops is a straight piece of wire that has been bent into a horseshoe shape;
wherein the loose ends of the individual loop are inserted into the bottom of the handle body;
wherein each of the plurality of wire loops extend into the handle body by a different distance so that the bent portion of the individual loops pass each other without interference at the bottom of the whisk and digital thermometer;
wherein the temperature probe comprises a metal shaft located at the longitudinal center of the whisk and digital thermometer;
wherein the temperature probe couples to the circuit board located within the cap and runs through the center of the handle, emerging from the bottom of the handle and running towards the bottom of the whisk and digital thermometer;
wherein the temperature probe stops before reaching the plurality of wire loops at the bottom of the whisk and digital thermometer;
wherein the temperature probe comprises a temperature sensor which is located at the bottom of the temperature probe and which is coupled to the circuit board via wiring.

2. The whisk and digital thermometer according to claim 1 wherein the whisk and digital thermometer further comprises a spider;
wherein the spider provides mechanical support for the plurality of wire loops and for the temperature probe;
wherein the spider comprises a central ring, a plurality of radial arms, and a plurality of loop clips.

3. The whisk and digital thermometer according to claim 2
wherein the central ring has an inner diameter that is at least as large as an outer diameter of the temperature probe;
wherein there are two individual radial arms for each one of the individual loops comprising the whisk;
wherein the plurality of radial arms extended outward from the central ring and are equally spaced around the circumference of the central ring;
wherein the plurality of loop clips are coupled to the ends of the plurality of radial arms;
wherein there are two individual loop clips for each one of the individual loops comprising the whisk;

wherein the individual loop clip selected from the plurality of loop clips comprises a ring with a loop clip gap;

wherein the loop clip gap extends from 25% of the circumferences of the plurality of loop clips to 50% of the circumference of the plurality of loop clips;

wherein the individual radial arm couples to the individual loop clip at a point on the circumference of the plurality of loop clips;

wherein the plurality of loop clips clip onto the plurality of wire loops and thereby mechanically couple the plurality of wire loops to the spider.

4. The whisk and digital thermometer according to claim 3 wherein the temperature probe passes through the central ring;

wherein the plurality of loop clips are coupled to the plurality of wire loops by pressing each of the individual loops into one of the individual loop clips;

wherein each of the individual loops couples to two of the individual loop clips, on opposites sides of the central ring.

5. The whisk and digital thermometer according to claim 4 wherein the operator control panel comprises a temperature display, an on/off control and a unit selection control;

wherein the temperature display is a display which is coupled to the electronics and which is used to display the temperature currently sensed by the temperature sensor located in the temperature probe;

wherein the temperature display displays at least 2 digits.

6. The whisk and digital thermometer according to claim 5 wherein the temperature display is an LCD display or an LED display.

7. The whisk and digital thermometer according to claim 6 wherein the on/off control is a control that allows the whisk and digital thermometer to be turned on and off.

8. The whisk and digital thermometer according to claim 7 wherein is a button where each activation of the button toggles the whisk and digital thermometer between an on state and an off state;

wherein the whisk and digital thermometer is operative to measure and report the temperature when in the on state;

wherein the whisk and digital thermometer is not operative in the off state.

9. The whisk and digital thermometer according to claim 8 wherein the unit selection control is a control that selects between Fahrenheit and Celsius units displayed on the temperature display.

10. The whisk and digital thermometer according to claim 9 wherein the one or more batteries provides electrical energy to power the circuit board, the operator control panel, and the temperature sensor;

wherein the one or more batteries are located within the handle;

wherein the one or more batteries are accessible by removing the cap;

wherein the one or more batteries are replaceable or rechargeable.

11. The whisk and digital thermometer according to claim 10 further comprising a voice synthesis unit and a sound transducer;

wherein the voice synthesis unit comprises one or more electronic components that produce a signal that conveys a recognizable voice;

wherein the voice synthesis unit accepts a signal representing the temperature being displayed on the temperature display and produces an audio signal representing the audio of the temperature value being spoken;

wherein the audio signal is sent via wiring to the sound transducer located within the handle to be converted into an audible sound.

12. The whisk and digital thermometer according to claim 11 further comprising a wireless transceiver;

wherein the wireless transceiver accepts the audio signal and is adapted to wirelessly transmits an RF signal carrying the audio signal to a wireless earpiece worn by the cook.

13. The whisk and digital thermometer according to claim 12 wherein the wireless earpiece is a Bluetooth® earpiece and the RF signal between the whisk and digital thermometer and the wireless earpiece conforms to one or more Bluetooth® protocols or standards.

* * * * *